United States Patent [19]

Park

[11] 4,227,419
[45] Oct. 14, 1980

[54] CAPACITIVE PRESSURE TRANSDUCER
[75] Inventor: Kyong Park, Chatsworth, Calif.
[73] Assignee: Kavlico Corporation, Chatsworth, Calif.
[21] Appl. No.: 72,016
[22] Filed: Sep. 4, 1979
[51] Int. Cl.³ .............................................. G01L 9/12
[52] U.S. Cl. ...................................... 73/724; 73/708; 361/283
[58] Field of Search ......................... 73/324, 318, 308; 361/283

[56] References Cited
U.S. PATENT DOCUMENTS

| | | | |
|---|---|---|---|
| 3,748,571 | 7/1973 | Kurtz | 361/283 |
| 3,858,097 | 12/1974 | Polye | 73/708 |
| 3,948,102 | 4/1976 | Coon | 73/724 |
| 3,952,234 | 4/1976 | Birchall | 73/724 |
| 4,064,550 | 12/1977 | Dias et al. | 73/724 |
| 4,158,217 | 6/1979 | Bell | 361/283 |
| 4,178,621 | 12/1979 | Simonelie | 73/724 |

Primary Examiner—Donald O. Woodiel
Attorney, Agent, or Firm—Poms, Smith, Lande & Rose

[57] ABSTRACT

A highly linear capacitive pressure transducer system includes one or more conductive plates mounted on a diaphragm for deflection toward and away from another conducting plate. The opposed conductive plates include both a main variable capacitor and a small separate compensation capacitor mounted on the same structure. The small compensation capacitor is connected in parallel with a larger fixed reference capacitor. The outputs from the main variable capacitor, and from the reference capacitance including the fixed capacitor and the small variable capacitor, are compared in electronic circuitry which produces an output signal proportional to the variations in pressure applied to the diaphragm. When the small variable capacitor has a change in capacitance with pressure generally of the same order of magnitude as the deviations from linearity of the main variable capacitor, the linearity of the output signal with changes in pressure is significantly increased.

13 Claims, 8 Drawing Figures

CAPACITIVE PRESSURE TRANSDUCER

FIELD OF THE INVENTION

The present invention relates to capacitive pressure transducer systems.

BACKGROUND OF THE INVENTION

It has previously been proposed to make pressure transducers in which capacitive plates are spaced apart and mounted on one or more ceramic diaphragms. Such transducers are disclosed, for example, in U.S. Pat. No. 4,064,550; and in U.S. patent application Ser. No. 898,518, filed Apr. 20, 1978, and assigned to the assignee of the present invention. As disclosed in the prior patent application, one plate of a capacitor may be mounted on a flexible circular ceramic diaphragm, and the other plate of the capacitor may be mounted in facing relationship on a heavier substrate. The diaphragm may be spaced from the substrate around its periphery by the use of glass frit, which not only spaces the diaphragm apart from the substrate but also seals the periphery of the diaphragm to the substrate. When pressure is applied to the outer surface of the diaphragm it deflects towards the substrate and the two facing conductive plates come closer together, thereby increasing the capacitance of the pressure sensing capacitor. In order to convert the capacitance changes to an electrical signal representing the difference in pressure, a fixed reference capacitor has been employed, and two frequency generation circuits were established with one using a fixed reference capacitance and the other using the pressure variable capacitor of the type mentioned above. Phase differences are caused by the change in capacitance of the variable capacitor, these differences are detected, and a d.c. voltage which is generally proportional to the capacitance change is generated.

In general, good linearity has been achieved using the circuit as described above, but at pressures above 100 kilopascals, the departure from linearity reached the level of about one percent to two percent. For convenience it is noted that 96 kilopascals is approximately equal to one atmosphere or one bar of pressure, which in turn is equal to about 14.7 pounds per square inch. While linearity to within 1 or 2 percent is sufficient for most purposes, it would be desirable to substantially reduce even this low level of non-linearity at higher pressures.

Accordingly, a principal object of the present invention is to improve the linearity of capacitive pressure transducers, and of systems utilizing such transducers.

SUMMARY OF THE INVENTION

In accordance with a broad aspect of the present invention a single pressure transducer is provided with a large or principal pressure sensing capacitor which has an output which is slightly non-linear; and the same pressure is applied to a small compensating variable capacitor which has a change in capacitance in the same order of magnitude as the departure from linearity of the main pressure sensitive capacitor; and electronic circuitry is provided for compensating for the deviations from linearity of the main pressure sensing capacitors through the changes in capacitance of the smaller compensating capacitor.

In accordance with a more comprehensive aspect of the invention a reference capacitance which includes both the compensating variable capacitor and also a larger fixed capacitor controls one frequency generation circuit, and the main pressure sensitive variable capacitor controls another corresponding frequency generation circuit. As the main capacitor varies, the phase relationships will shift slightly and an output phase detection circuit associated with the two circuits will detect the resulting phase shift and provide an output voltage which corresponds directly to this phase shift. Alternatively, a variable frequency output signal may be provided.

In accordance with a subordinate aspect of the invention, the small compensating variable capacitor may be shaped, and located on the pressure transducer structure, in such manner as to provide the desired compensation, or to produce a desired output characteristic, with the size and position on the transducer determining the magnitude and characteristic of the modification or compensation of the basic curve which is produced. More specifically, the small compensating capacitor may be located near the periphery of the transducer, may be pie-shaped, or may have somewhat modified pie-shaped configuration, or can extend to near the center of the diaphragm. Each location will provide a different composite voltage versus pressure characteristic.

Advantages of the invention include modification of the deviation characteristic of diaphragm type capacitive pressure transducer systems, and a significant increase in their linearity.

Other objects, features and advantages of the present invention will become apparent from a consideration of the following detailed description and from the drawings.

DETAILED DESCRIPTION

Figure 1:
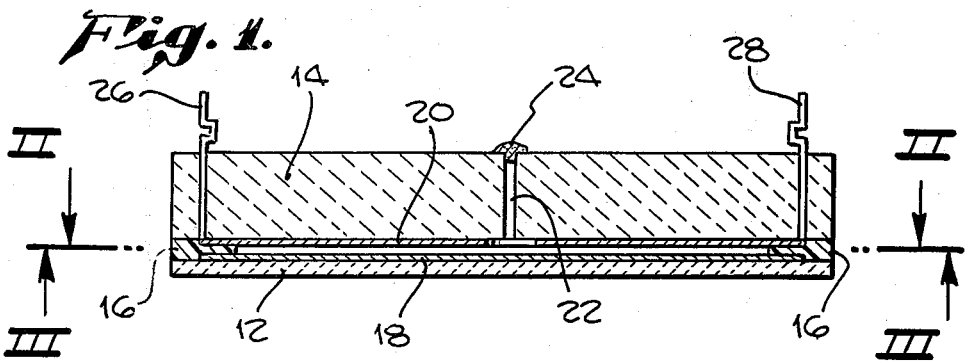
FIG. 1 is a cross-sectional showing of a capacitive pressure transducer.

Referring more particularly to the drawings, FIG. 1 shows a variable capacitor transducer including a flexible diaphragm 12 mounted on a thicker substrate 14, and sealed to the substrate by a peripheral ring of glass frit 16. The diaphragm 12 and the substrate 14 have conducting surfaces 18 and 20, mounted on their surfaces which are facing one another. Incidentally, the showing of FIG. 1 is not to scale, as the thickness of the conductive plates and their spacing (in order or one to a few thousandths of an inch) are such that a scale drawing of these dimensions is not practical. The glass frit is initially made of a mixture of glass particles having different melting points, but all having substantially the same coefficient of thermal expansion as the diaphragm 12 and the substrate 14, and these glass particles are fused by heating to an elevated temperature. The periphery of a diaphragm is sealed to the substrate by those particles which melt, and the particle size of the remaining glass particles which do not melt, controls the spacing of the diaphragm from the substrate. This is normally from one to a few thousandths of an inch.

The diaphragm and substrate are preferably made of the same material such as quartz, aluminum oxide of high purity which is also designated by the term "alumina", or similar materials. Either quartz or alumina have low hysteresis and are suitable for use in the transducer of FIG. 1. Communication to the space between the diaphragm and the substrate may be obtained through the bore 22 which as shown in FIG. 1 is sealed by the glass bead 24. Electrical connections may be made to the conductive layers 18 and 20 on the opposed surfaces of the diaphragm 12 and the substrate 14 by leads such as leads 26 and 28 which extend through holes in the substrate 14. In one representative example, the transducer was in the order of one and one-quarter inch in diameter and was in the order of ¼ inch in thickness.

Figure 2:
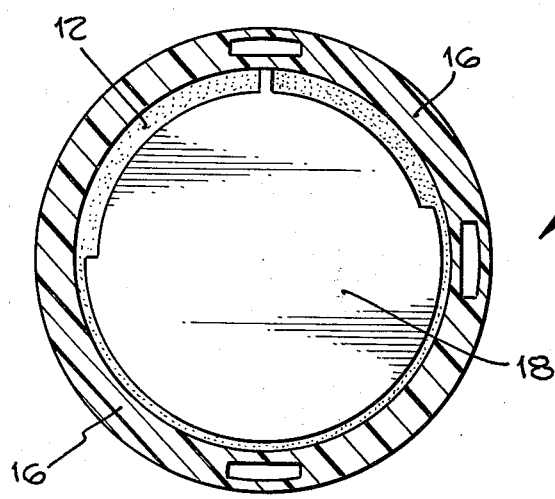
FIG. 2 shows the conducting plate mounted on the diaphragm of the transducer of FIG. 1.
Figure 3:
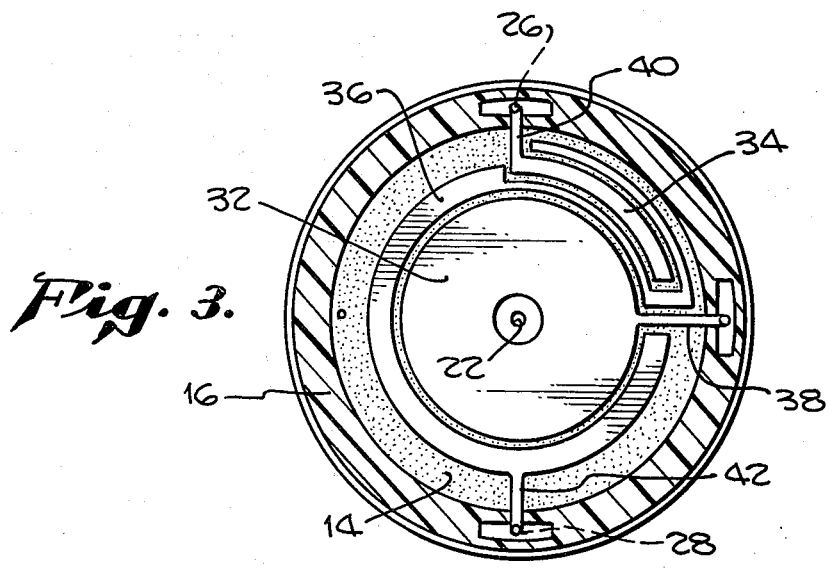
FIG. 3 shows both the principal pressure sensitive capacitive plate and the smaller compensating capacitive plate which are mounted on the substrate of the transducer of FIG. 1.

FIGS. 2 and 3 are both taken through the space between the diaphragm 12 and the substrate 14 of FIG. 1. FIG. 2 is taken toward the diaphragm and shows the conductive plate 18 which covers the greater portion of the diaphragm 12, and also shows the glass frit 16 in a cross-section. As mentioned above, the glass frit 16 both spaces and seals the periphery of the diaphragm to the periphery of the substrate.

FIG. 3 shows the conductive pattern on the substrate 14. The thin conductive layer includes the main variable capacitive plate 32, the small compensating variable capacitor 34, and the guard ring structure 36 which serves to substantially isolate the two capacitors. External connections to the three conductive areas 32, 34, and 36 are made by the radially extending portions of the conductive coating 38, 40 and 42, respectively, which engage leads which extend through the holes through the substrate, as indicated at 26 and 28 in FIG. 1.

Figure 4:
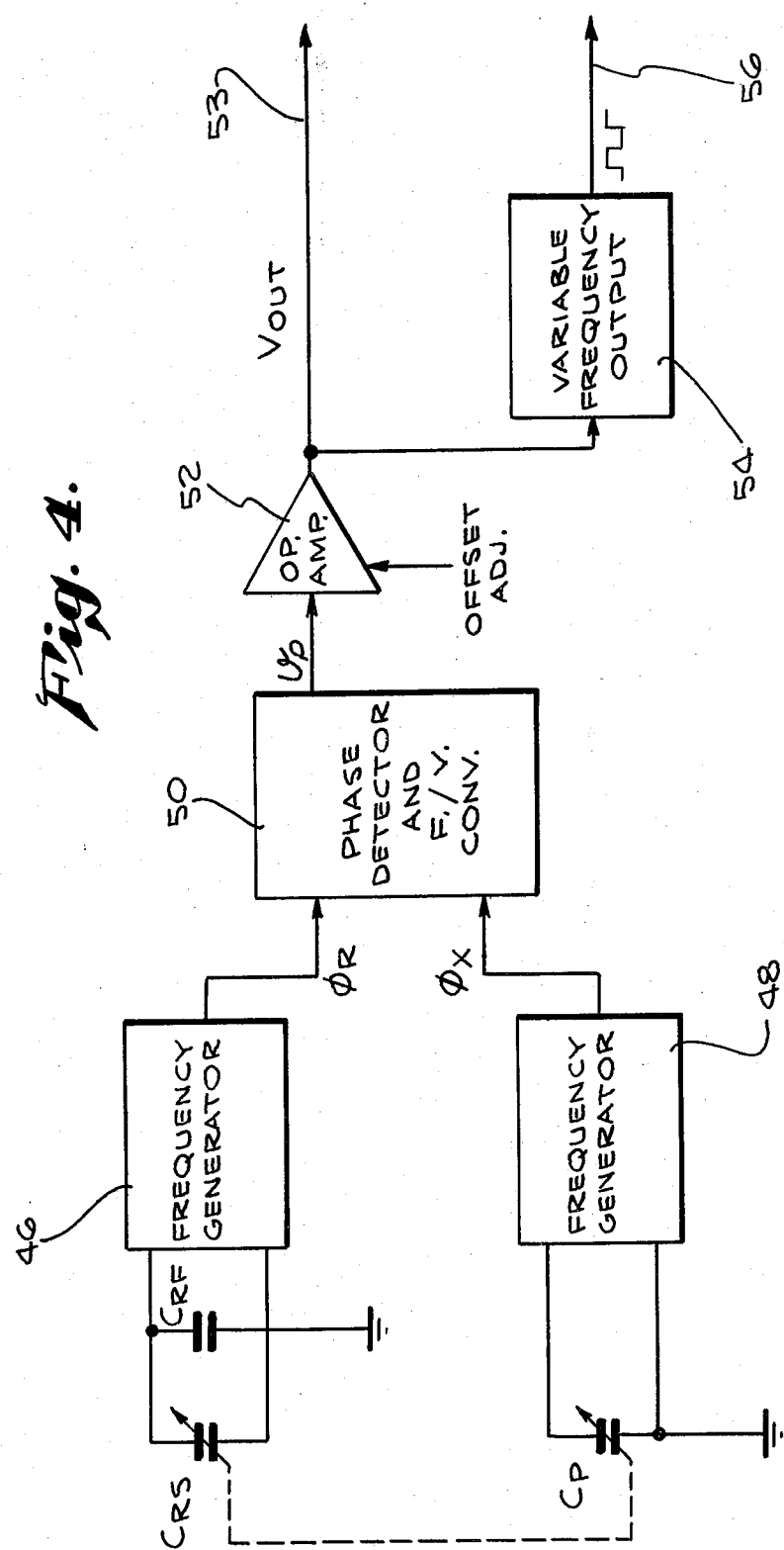
FIG. 4 is a simplified block circuit diagram of electronic circuitry for producing an output voltage proportional to capacitance.

The sensor shown in FIGS. 1 thru 3 is employed in the electronic circuit shown in block diagram form in FIG. 4. The main variable capacitor $C_P$ is the capacitor formed between the plate 32 shown in FIG. 3 and the round plate 18 on the diaphragm, as shown in FIG. 2. The compensating variable capacitor, designated $C_{RS}$ in FIG. 4, is the capacitor formed by the small conducting plate 34 on the substrate as one electrode, and the round plate 18 on the diaphragm as the other electrode. Incidentally, the plate 18 is grounded. As shown in FIG. 4, the small compensating capacitor $C_{RS}$ is connected in parallel with a larger fixed capacitance $C_{RF}$. The two frequency generation circuits 46 and 48 are connected to the reference capacitor combination, and to the main variable capacitance $C_P$, respectively. The outputs from the two circuits 46 and 48 are connected to the phase detector and frequency-to-voltage conversion circuit 50 and then to the operational amplifier 52. An optional variable frequency circuit 54 may be provided to convert the variable d.c. voltage at output lead 53 to a variable frequency signal on output lead 56. Accordingly, as the pressure applied to the diaphragm of the capacitive pressure transducer changes, the resultant difference in phase of the two signals from the frequency generator circuits 46 and 48 is detected and the resulting series of pulses are integrated to provide a varying d.c. voltage corresponding to the variations in the applied pressure.

Attention is now directed to Tables I and II, set forth below. These two tables show the capacitance of the main variable capacitors $C_P$ and the variable compensating capacitor $C_{RS}$ at different levels of pressure, with the pressure being given in kilopascals (KPa).

TABLE I

| Changes in Capacitance With Pressure | | |
|---|---|---|
| Pressure | Capacitance (pf) | |
| (KPa) | $C_P$ | $C_{RS}$ |
| 17 | 67.42 | 11.14 |
| 41 | 70.96 | 11.26 |
| 58 | 73.70 | 11.34 |
| 88 | 79.37 | 11.49 |
| 105 | 83.15 | 11.57 |

TABLE II

| Output Voltage vs. Pressure (Voltage (Volts, D.C.)) | | | | |
|---|---|---|---|---|
| Pressure KPa | w/Fixed $C_R$ | Deviation* | w/$C_{RS}$ + $C_{RF}$ | Deviation* |
| 17 | 1.457 | 0 | 1.457 | 0 |
| 41 | 3.049 | 0 | 3.025 | −0.024 |
| 58 | 4.204 | 0.027 | 4.172 | −0.005 |
| 88 | 6.338 | 0.171 | 6.271 | +0.104 |
| 105 | 7.683 | 0.389 | 7.512 | +0.217 |
| Non-linearity Error (%) | 1.421% | | 0.901% | |

NOTE:
*The straight line is $V_{out} = 0.32933 + 0.06633P$

Figure 5:
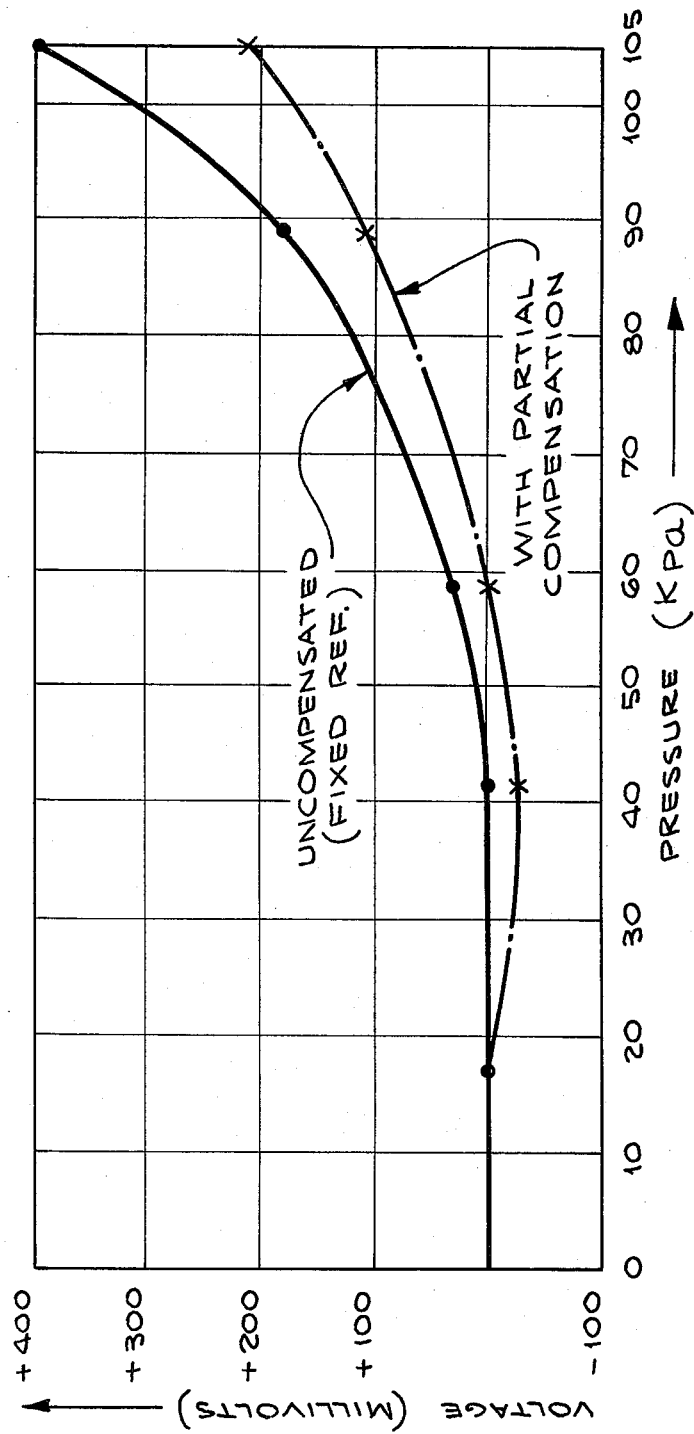
FIG. 5 shows a pair of plots of deviation versus pressure for capacitive pressure transducers of the type shown in FIGS. 1 thru 3, using the circuit of FIG. 4, both with and without compensation.

Now, attention is directed to Table II and FIG. 5, which plots the third and fifth columns of Table II. More specifically, the voltages set forth in the second and fourth column of Table II are the outputs on lead 53 in FIG. 4. Note that, using a fixed reference capacitor $C_R$, the deviation from linearity reaches 389 millivolts, for a non-linearity error of 1.421 percent. This is shown in the upper continuous line plot of FIG. 5. On the other hand, column 5 shows the deviation using the parallel combination of $C_{RS}$ and $C_{RF}$, and in this case the maximum deviation is only 217 millivolts for a percentage error of less than one percent.

Incidentally, using the circuit as shown in FIG. 4 (and in greater detail in FIG. 6), the output voltage is given by the following expression:

$$V_{out} = f\left[ b_1 V_{cc} - b_2 \left( \frac{C_R}{C_P} \right)^{\pm 1} V_{cc} \right] \quad (1)$$

In the foregoing expression, $V_{cc}$ is the supply voltage to the circuit, $C_R$ is the reference capacitor, and $C_P$ is the capacitance of the variable main pressure sensor. The "+1" or "−1" can be selected for the power of the fraction term depending on which of the two signals is taken as the reference signal for the phase detector in FIG. 4. If we use "+1" then the exponent on the fractional term may be ignored, or deleted as it was in equation (1).

From FIG. 5, we see that the deviation of the output voltage from linearity with a fixed reference capacitor is in the positive direction. Further, this departure from linearlity is in the amount of approximately 1.4%. Now, referring back to equation (1), it may be seen that, if $C_R$ were to be increased over the pressure range by some small amount, it would have the effect of reducing the deviation from linearity of $V_{OUT}$. More particularly, with the capacitance of $C_P$ being in the order of 70 picofarads, it would be expected that an increase in $C_R$, the reference capacitance, by about one percent of 70 picofarads, or about 0.7 picofarad would nearly compensate for the departure for linearity at the upper end of the scale. In practice a somewhat smaller value for the compensating resistor was chosen, one of about 11 picofarad, having a shift throughout the pressure range of approximately 0.43 picofarads. The result is indicated in the lower plot of FIG. 5 (drawn in dash-dot or phantom line form) showing very slight deviations from linearity in the negative direction at lower pressures, and a reduced deviation of less than one percent at 105 kilopascals pressure. By making the compensating capacitance $C_{RS}$ slightly greater, the final deviation could have been reduced further.

Figure 6:
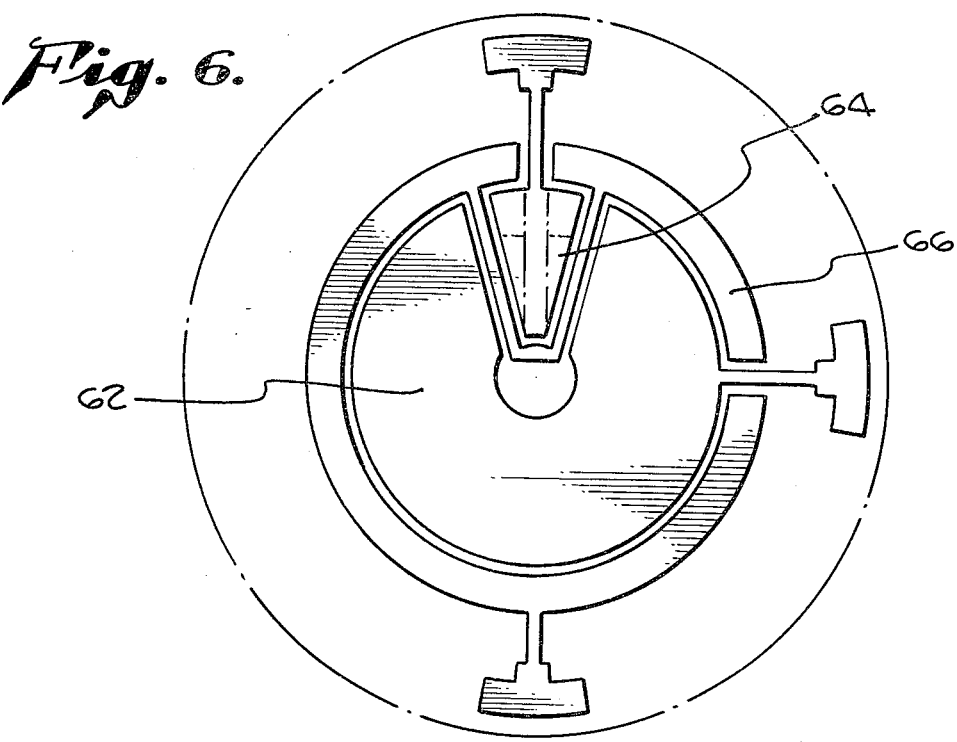
FIGS. 6 and 7 are alternative geometries for providing different capacitance versus pressure characteristics for the small variable compensating capacitor.
Figure 7:
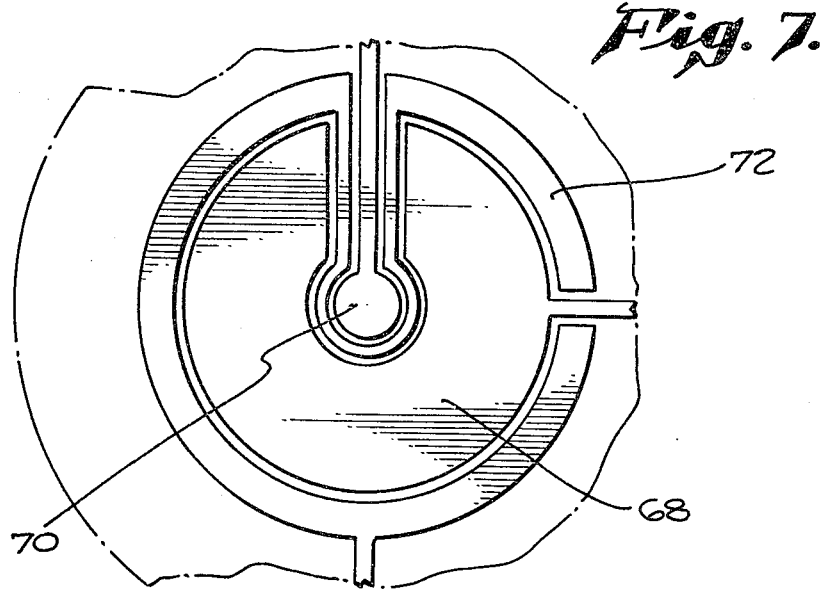

It is also possible to vary the shape of the compensating variable capacitor $C_{RS}$ and its location on the substrate, to provide a different capacitance versus pressure characteristic. Two such alternative arrangements are shown in FIGS. 6 and 7. In FIG. 6, the main variable capacitor 62 has a pie-shaped cut-out portion into which the compensating capacitor 64 extends. The isolating conductive strip 66 extends around the periphery of both capacitors and between them. Each of these three conductive members includes strips extending to the periphery of the substrate for connecting to leads in the manner discussed hereinabove for the first embodiment of the invention.

Figure 8:
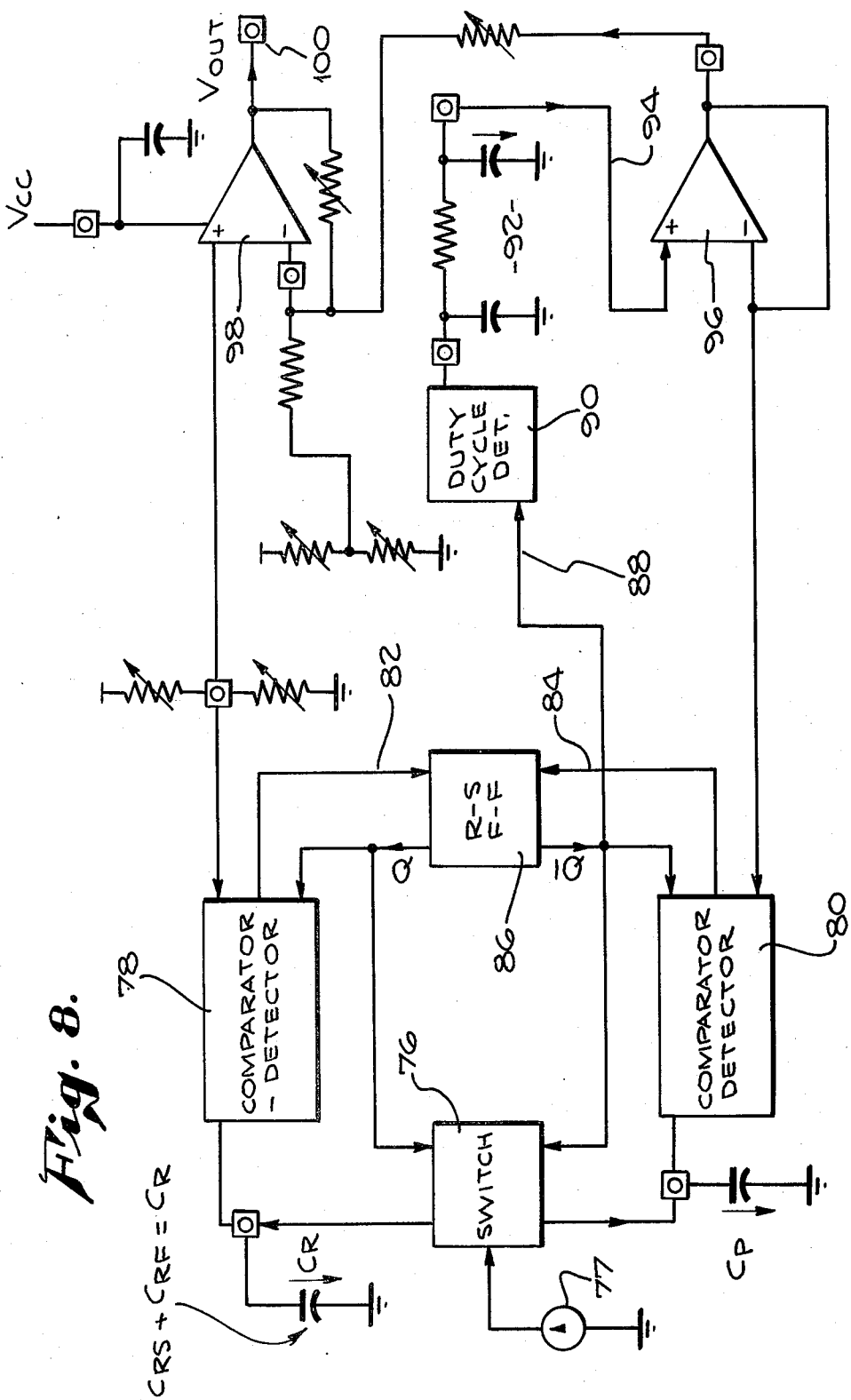
FIG. 8 is a more detailed block circuit diagram of one specific implementation of the circuit of FIG. 4.

The embodiment of FIG. 7 includes the main variable capacitor 68, the correction or compensating capacitor 70 and a shielding electrode 72. From FIGS. 3, 6 and 7, it is evident that a number of various compensating configurations may be selected, to achieve the desired output characteristic. Incidentally, each of the compensating electrodes 64 and 70 shown in FIGS. 6 and 7, respectively, could be reduced in size by cutting away a portion of the conductive area of the compensating electrodes. This was actually done in practice, as shown by the dashed lines in FIG. 6 by which the electrode was successively reduced in size. When a somewhat arrow-shaped compensating capacitor of the type shown in FIG. 6 was employed, the deviation from linearity initially had a downward slope, and subsequently had a positive slope. Accordingly, it appears that a composite shape of this general type might well achieve very nearly full linearity, when a proper size capacitor is employed, For completeness, FIG. 8 is included to show a more detailed block circuit diagram indicating the implementation of the circuit of FIG. 4. In FIG. 8 the switch 76 alternately charges the capacitor $C_P$ or the capacitor $C_R$, which includes the small compensating capacitor $C_{RS}$ and the larger fixed reference capacitor $C_{RF}$, from current source 77. When the capacitors charge to a predetermined voltage level, the comparator-detector circuits 78 and 80 apply set and reset signals on leads 82 and 84, respectively, to the flip flop 86. The Q, and $\overline{Q}$ signals reverse the position of the switch 76 from charging one of the two capacitors to charging the other. Accordingly, the output on lead 88 is a pulse train. The positive and negative portions of the pulse train are equal in their duration, when the capacitor $C_P$ is precisely equal to the capacitor $C_R$. However, as the capacitor $C_P$ increases, the positive going pulses persist for a longer period of time because of the longer time required for charging the larger capacitor. The action of the duty cycle detector 90 and the integrator circuit 92 is to provide an output signal on lead 94 to the operational amplifier 96 which varies in amplitude with the variations in capacitance of $C_P$. Accordingly, the final output from the operational amplifier 98 at terminal 100 is a positive voltage of the type tabulated in Table II. The circuit shown in FIG. 8 is an integrated circuit and is available from Motorola under part number SCCF74116.

It is to be understood that the foregoing description and the associated drawings are merely illustrative of one embodiment of the invention. By way of example and not of limitation, other detection circuits may be employed to translate the transducer changes in capacitance into desired output signals, and the supplemental compensation capacitor could be used in such circuits to provide compensation in a manner analogous to its operation in the present circuitry. Also, by using different charging currents for the main variable capacitor and the reference capacitor, their relative sizes could be varied. Accordingly, the present invention is not limited to that precisely as shown and described herein.

What is claimed is:

1. An accurate pressure transducer system comprising:
    transducer means including a main variable capacitor and having a diaphragm including a conductive plate for deflecting toward and away from a second conductive plate in response to variations in pressure with the variations in capacitance being slightly non-linear over the desired operating pressure range;
    a reference capacitance, said reference capacitance including a principal fixed capacitor, and a small variable correction capacitor having a capacitance which is a minor fraction of that of said main variable capacitor;
    means for mounting said small variable compensation capacitor to change its capecitance in response to the variations in pressure applied to said main variable capacitor; and
    means for comparing the capacitance of said main variable capacitor and said reference capacitance and for producing an output signal of increased linearity through compensation provided by the variable correction capacitor.

2. A pressure transducer system as defined in claim 1 wherein said main variable capacitor and said small compensation capacitor are mounted in a single transducer to be varied together as said diaphragm deflects.

3. A pressure transducer system as defined in claim 1 wherein said comparing means includes electronic circuit means for alternately charging said main variable capacitance and said reference capacitance, in each case until a predetermined voltage is reached, and for producing an ouput voltage corresponding to the difference in charging times.

4. A pressure transducer system as defined in claim 1 wherein said transducer means includes a thin diaphragm of insulating material mounted a few thousandths of an inch from a thicker substrate, with a single conductive plate on one of the two facing surfaces, and a conductive layer divided into at least two spaced conductive plates of different size on the other facing surface, to form the main and the compensation variable capacitors.

5. A pressure transducer system as defined in claim 4 wherein said diaphragm and substrate are circular.

6. A pressure transducer system as defined in claim 4 wherein the conducting plates associated with the main and the compensating variable capacitors are separated by a guard ring.

7. A pressure transducer system as defined in claim 5 wherein the conductive plate area associated with said compensating capacitor is located near the periphery of said transducer means.

8. A pressure transducer system as defined in claim 5 wherein the conductive plate area associated with said compensating capacitor extends radially for the greater extent of the active surfaces of said diaphragm and substrate.

9. A pressure transducer system as defined in claim 1 wherein means are provided for changing the capacitance of said variable compensating capacitor by an amount having an order of magnitude corresponding to the departure in linearity of the main variable capacitor.

10. A pressure transducer system comprising:
principal pressure sensitive capacitance means for providing a generally linear capacitance vs. pressure characteristic, but with slight departures from linearity;
electronic means coupled to said principal capacitance means for producing an output electrical signal which varies substantially in correspondence with the changes in capacitance of said principal capacitance means; and
compensating means for reducing said departures from linearity, said compensating means including a small compensating pressure sensitive capacitance means coupled to vary with changes in pressure with said principal pressure sensitive capacitance means, and additional electronic means for utilizing the changes in capacitance of said compensating capacitance means for changing said output electrical signal to reduce said departures from linearity.

11. A pressure transducer system as defined in claim 10 including means for mounting both said principal and said small compensating capacitance means on a single pressure transducer for simultaneous and concurrent variation.

12. An accurate pressure transducer system comprising:
transducer means including a main variable capacitor having a diaphragm including a conductive plate for deflecting toward and away from a second conductive plate in response to variations in pressure, with the variations in capacitance being slightly non-linear over the desired operating pressure range;
a small variable correction capacitor having a capacitance which is a minor fraction of that of said main variable capacitor; and
means for mounting said small variable correction capacitor to change its capacitance in response to the variations in pressure applied to said main variable capacitor, by an amount having an order of magnitude corresponding to the departure in linearity of the main variable capacitor.

13. A pressure transducer system as defined in claim 12 wherein said main variable capacitor and said small compensation capacitor are mounted in a single transducer to be varied together as said diaphragm deflects.

* * * * *